(12) United States Patent
Williamson et al.

(10) Patent No.: US 9,479,452 B2
(45) Date of Patent: Oct. 25, 2016

(54) METHODS AND APPARATUS FOR USING BANDWIDTH SUBJECT TO CELLULAR INTERFERENCE

(71) Applicant: Time Warner Cable Enterprises LLC, New York, NY (US)

(72) Inventors: Louis D Williamson, Denver, CO (US); Michael Kelsen, Centreville, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 80 days.

(21) Appl. No.: 14/530,324

(22) Filed: Oct. 31, 2014

(65) Prior Publication Data

US 2016/0127264 A1     May 5, 2016

(51) Int. Cl.
*G01R 31/08*     (2006.01)
*H04L 12/927*    (2013.01)
*H04L 1/00*      (2006.01)
*H04L 12/26*     (2006.01)

(52) U.S. Cl.
CPC ............ *H04L 47/805* (2013.01); *H04L 1/007* (2013.01); *H04L 1/0071* (2013.01); *H04L 43/0847* (2013.01)

(58) Field of Classification Search
None
See application file for complete search history.

(56) References Cited

U.S. PATENT DOCUMENTS

| | | | | |
|---|---|---|---|---|
| 5,774,808 A * | 6/1998 | Sarkioja | ............. | H04W 72/082 370/332 |
| 6,006,267 A * | 12/1999 | Nguyen | ................ | H04L 12/184 709/227 |
| 6,603,975 B1 * | 8/2003 | Inouchi | ..................... | H04L 1/20 370/468 |
| 7,385,924 B1 * | 6/2008 | Riddle | ................ | H04L 12/2602 370/235 |
| 2003/0053469 A1 * | 3/2003 | Wentink | .............. | H04L 12/5693 370/412 |
| 2008/0220805 A1 * | 9/2008 | Dayal | ................... | H04W 52/10 455/522 |
| 2010/0067489 A1 * | 3/2010 | Pelletier | ................ | H04W 48/17 370/331 |
| 2011/0242966 A1 * | 10/2011 | Van Caenegem | ... | H04L 12/5693 370/216 |
| 2012/0057537 A1 * | 3/2012 | Schein | .................. | H04W 72/10 370/329 |
| 2012/0082028 A1 * | 4/2012 | Kojima | ................. | H04W 36/22 370/230 |

* cited by examiner

*Primary Examiner* — Robert Wilson
(74) *Attorney, Agent, or Firm* — Michael P. Straub; Stephen T. Straub; Ronalc P. Straub

(57) ABSTRACT

Methods and apparatus for using communications channels corresponding to frequency bands subject to cellular network, e.g., LTE, interference and/or other interference are described. The methods are well suited for use of cable networks where communications over a coax cable or via cable device may be subject to LTE interference. In various embodiments data traffic is classified based on whether the traffic corresponds to a protocol that supports a retry communications mechanism in the event of a communication error, the type of traffic data and/or the priority of the traffic data. In some embodiments data being communicated using a protocol which supports a retry mechanism are routed over channels subject to interference even if, in some cases, the packets correspond to data which has a higher priority or QoS requirements than packets, e.g., best effort packets, which are transmitted using a protocol that does not support a packet retry mechanism.

15 Claims, 6 Drawing Sheets

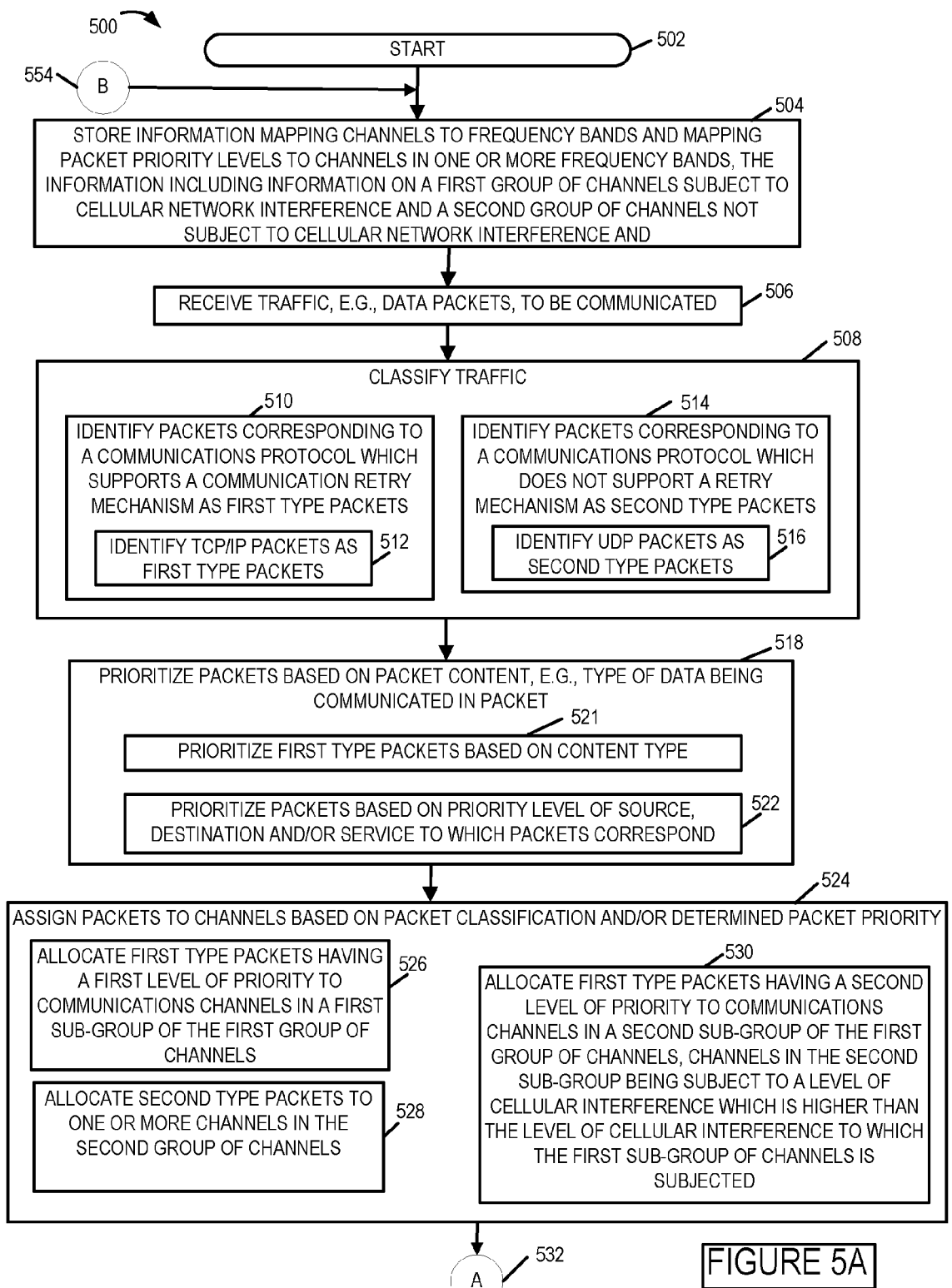

METHODS AND APPARATUS FOR USING BANDWIDTH SUBJECT TO CELLULAR INTERFERENCE

FIELD

The present invention relates to methods and apparatus relating to using communications bandwidth which is subject to interference, e.g., bandwidth of a cable network subject to interference from communications devices.

BACKGROUND

Cable communications systems and cable devices use a wide range of frequencies to communicate various types of data and/or signals over coax cable. FIG. 1 illustrates an exemplary frequency allocation 100 which may be used in a convention cable system. As illustrated, the exemplary frequency band extends from 0 MHz to 860 MHz.

The low frequency range 0 to 10 MHz is generally left unused in cable systems due to interference from a variety of devices including garage door openers, wireless alarm system signals, etc.

The 10 MHz to 40 MHz frequency band shown in FIG. 1 is often used for, e.g., dedicated to, upstream communications, e.g., data or other communications from a device such as a set top box, via a coax cable network to a device, e.g., a cable modem termination system located at a hubsite or headend. A crossover filter is sometimes used between 42 and 50 MHz in which case these frequencies may be unusable.

Above 50 MHz the communications band shown in FIG. 1 is used for a variety of different types of downstream signals used to communicate information and/or content from a network headend to a customer premise device, e.g., STB located at a customer premise.

A small gap or guard band may exist between the upstream and downstream bands. Thus in the FIG. 1 example the downstream content delivery band is shown corresponding as corresponding to the 50-860 MHz band.

The downstream content may include, for example, analog program content such as broadcast TV programs, broadcast digital program content, switched digital video content, on demand content which may be IP video content and/or unicast data, e.g., downstream Internet traffic data and/or other types of signals.

It should be appreciated that the frequency bands used by cellular communications networks normally range from 700 to 800 MHz. Filters and shielding have until recently proven reasonably successful from protecting cable network communications from radio interference from cellular communications devices, e.g., CDMA or GSM devices. Such interference maybe heard, for example, when a cell phone is near a radio and the interference causes clicking or other noise sounds that are sometimes heard in the audio output of the radio. In the case of communications systems, the effect of the interference is often communications errors which can reduce the reliability of a communications channel.

Over time, cellular systems have been called on to communicate ever greater amounts of traffic whether that be voice traffic or data traffic. In order to support the increasing amounts of traffic many wireless carriers have been switching to what is commonly referred to as 4G systems. LTE (Long Term Evolution) is a common 4G communications standard which is growing in popularity with larger numbers of cell phones and other 4G devices being deployed and purchased at a relatively high rate.

Unfortunately, 4G devices and LTE signals in particular tend to cause interference which is not easily filtered out by many currently deployed cable network devices. Furthermore, the shielding on many cable devices and cables is proving inadequate with respect to protecting from interference from LTE devices.

LTE interference is often caused by a mobile phone or other LTE User Equipment device (UE) being in close proximity to a STB (Set Top Box) or other cable device and being in use, e.g., to transmit or receive data. Accordingly, such interference with respect to an individual customer premise device may not be constant or predictable because it may vary depending on the presence of users with cell phones or other LTE devices, their proximity to a STB or other cable network device and whether or not they are using the LTE device to communicate information. Even when not in active use by the user to transmit traffic, cellular devices can still cause interference since they periodically transmit control information, e.g., status, location and/or other information.

Thus, while interference over the wireless cellular band used for LTE may be a problem, the interference may not be consistent. Simply dropping or blocking use of the frequency channels that may be used for LTE communications would result in a significant loss of bandwidth currently being used for downstream signaling. Such a loss in bandwidth would be particularly undesirable from a commercial standpoint given the ever increasing need for both upstream and downstream communications bandwidth to communicate Internet traffic and/or other type of data to customer premises, e.g., for on demand or other high value services.

In view of the above discussion it should be appreciated that there is a need for methods and apparatus for using frequency bands in a communications system, e.g., a cable network system, which allow for bands subject to cellular network interference to be used in a productive and useful manner.

SUMMARY

Methods and apparatus for using frequency bands in a communications system, e.g., a cable network communications system, which are subject to interference from, e.g., devices operating in white space, TV carriers, wireless devices in 900 MHz band and/or cellular network interference, are described.

In accordance with various features, communications bands subject to network cellular interference are assigned to be used for communicating traffic data to/from customer premise devices rather for use in communicating downstream broadcast video, switched digital video and/or other types of communications which normally do not support retry mechanisms where data which is not successfully communicated initially is resent.

By allocating communications such as TCP/IP traffic supports communications retries in the event of errors to channels, e.g. channels of cable network communications link, meaningful use of bandwidth that might be unsuitable or unreliable for communicating broadcast video or other content can be achieved.

In at least some embodiments channels corresponding to cellular network frequency bands, are used for communicating data to and/or from a modem in a customer premise device using a communications protocol which supports a retry mechanism. Such channels which are subject to cellular network interference, e.g., LTE interference may be, and in some embodiments are, protected by a higher level of packet interleaving and/or error correction than channels which are not subject to cellular interference. Thus, in at least some embodiments communications bandwidth is divided into channels which are subject to cellular interference and some channels which are not subject to cellular interference. Channels which are subject to cellular interference may form a first group of channels with channels that are not subject to cellular interference forming a second group of channels.

Broadcast and/or other downlink communications data may be communicated over one or more of the channels in the second group of channels and delivered without the use of a retry communications mechanism to one or more devices located at customer premises.

Data, e.g., traffic data, to be transmitted to or from a cable modem or other customer premise device using a communications protocol which supports a retry mechanism in the event of a detected error or failure is identified in some embodiments. Traffic sent to, e.g., addressed to, a cable modem or other device using best effort traffic is also identified in some embodiments. The identification of different types of data to be transmitted from a CMTS (Cable Modem Termination System) to another CMTS is first classified by the sending CMTS and then allocated to individual traffic channels based on the classification information.

In some embodiments TCP/IP packets are classified as being of a first type corresponding to a communications protocol which supports a communications retry mechanism and UDP/IP packets are classified as being of a second type which corresponds to a communications protocol which does not support a communications retry mechanism.

In one particular exemplary embodiment, packets corresponding to a communications protocol which supports a retry mechanism, e.g., first type packets, are assigned to one or more communications channels in the first group of communications channels, e.g., channels subject to cellular network interference. In the same exemplary embodiment, packets corresponding to a communications protocol which does not support a retry mechanism, e.g., second type packets, are assigned to one or more communications channels in the second group of communications channels, e.g., channels which are not subject to cellular network interference even though the packets assigned to the second group of channels may be of lower priority, e.g., best effort packets, than the priority of packets assigned to the first group of communications channels.

In the above described manner channels subject to cellular network interference can be used with reliance on a retry mechanism to make up for packets lost due to cellular network interference and with error correction coding and/or packet interleaving being used to make communications over the interference prone channels more reliable than if such interference mitigation techniques were not used.

While higher priority traffic may be communicated over the first group of communications channels than over the second group of communications channels, within the set of data corresponding to the use of a retry communications protocol, there may be different types of data, e.g., voice, video and/or application data such as text, etc. In some but not necessarily all embodiments, packets assigned to the first group of channels is prioritized, e.g., based on the type of data and/or the application to which the data corresponds. Data being communicated using a protocol which supports a retry mechanism is, in some embodiments, allocated to channels in the first group taking into consideration interference and/or detected error rates on the individual channels in the first group. In one such embodiment higher priority data, e.g., voice data, is allocated to one or more of a first subgroup of channels with lower interference than other channels in the first group. Thus, within the group of channels subject to cellular network interference higher priority data is allocated to lower interference channels and lower priority data is allocated to channels with higher interference. While the supported retry mechanism, error correcting coding and/or packet interleaving on the channels in the first channel group which are subject to high interference from cellular devices, higher error rates may result in more packet retransmissions and/or the interleaving or error correction processing may result in higher transmission delays and/or a higher level of packet jitter than on the other channels in the first group with lower interference. Accordingly, by prioritizing traffic communicated over the first group of channels, and transmitting higher priority data over channels in the first group subject to lower interference than other channels, a higher quality of service (QoS) level is provided the higher priority data transmitted over the first group of channels than lower priority data even though reliable communication of both low and high priority data may be achieved.

In at least some embodiments communications retries and/or communications errors are monitored on individual channels in the group of channels subject to cellular network interference. The amount of error correcting coding and/or interleaving applied to a channel subject to cellular network interference may, and in some embodiments is varied over time in response to detected changes as reflected in a change a communications error rate or the number of communications retries begin detected during monitoring intervals.

In addition to changing the level of error correcting coding or interleaving, detected changes in channel quality as reflected by the monitored number of retries and/or detected errors is taken into consideration when assigning prioritized packets to individual channels in the first channel group, e.g., the group subject to interference.

By taking into consideration whether traffic data is being communicated using a protocol which supports a retry mechanism, channel conditions and/or the priority of data being communicated communications channels subject to cellular network interference can be reliable used in a productive manner, e.g., in a cable network system, where one or more of the devices or cables may have been deployed prior to LTE and/or other cellular network interference being a major concern.

While various exemplary embodiments and features have been described, numerous additional features and embodiments are described in the detailed description which follows.

DETAILED DESCRIPTION

Figure 2:
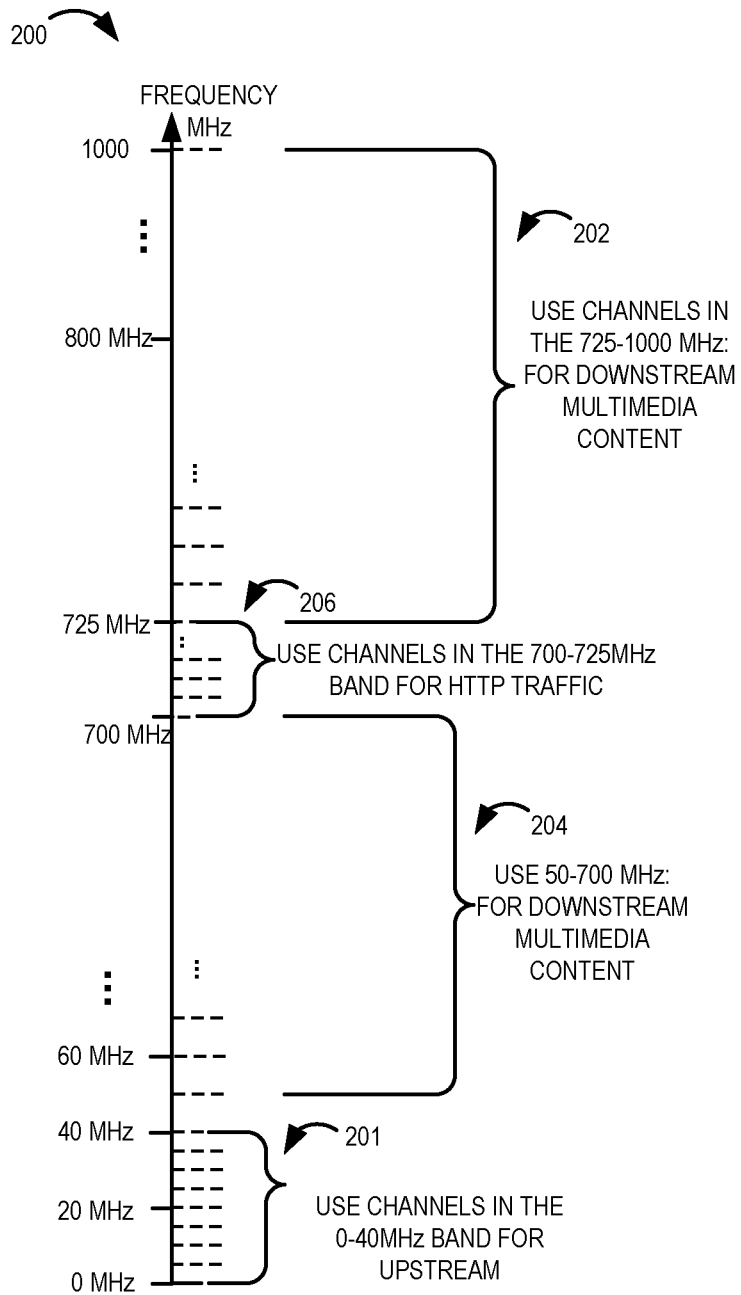
FIG. 2 illustrates an exemplary frequency allocation which may be used in an exemplary cable system implemented in accordance with an embodiment of the invention.

FIG. 2 illustrates an exemplary frequency allocation 200 which may be used in an exemplary cable system implemented in accordance with an embodiment of the invention. As illustrated, the exemplary frequency band extends from 0 MHz to 1000 MHz.

Figure 1:
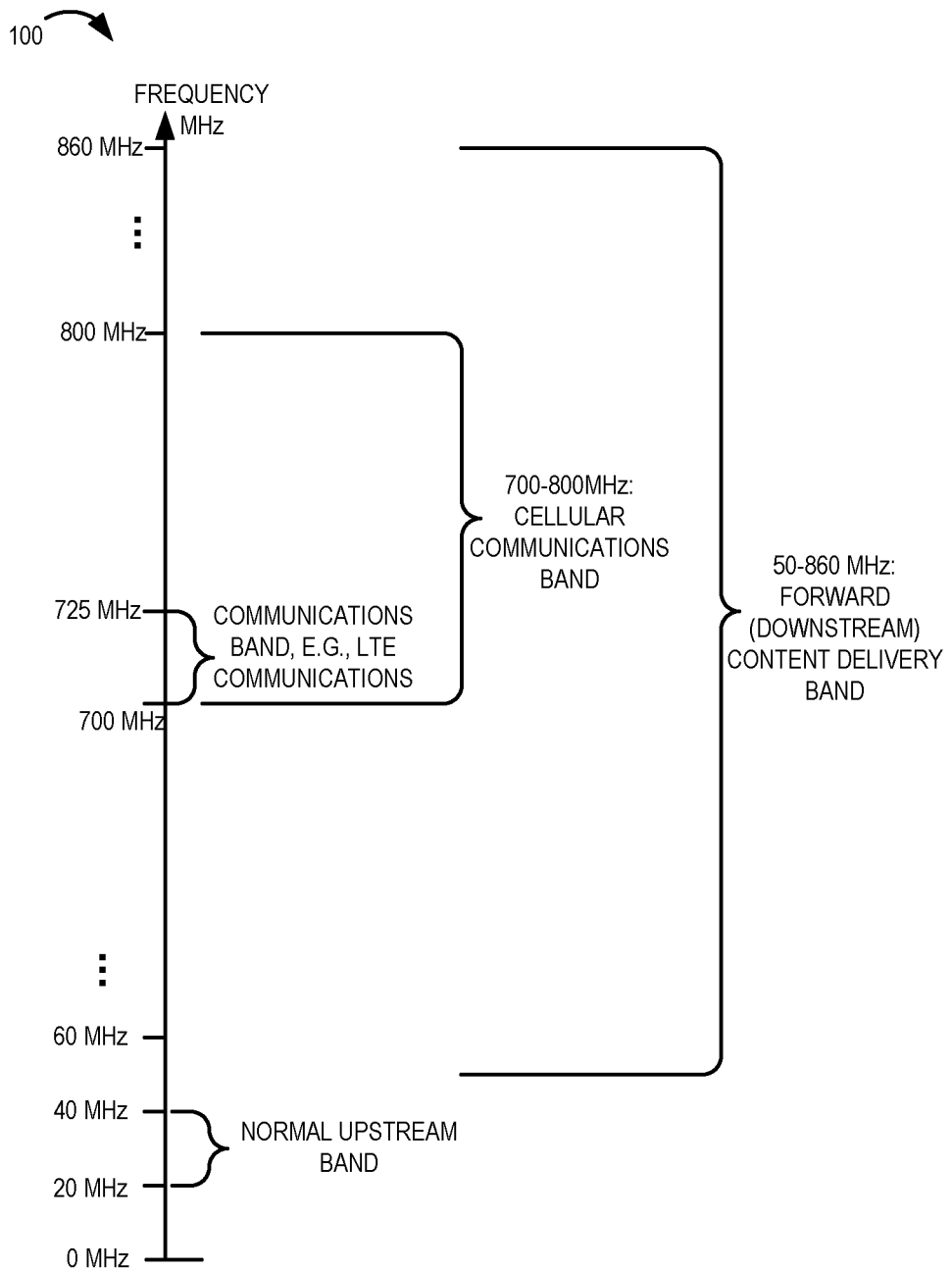
FIG. 1 illustrates a frequency allocation which may be used in a convention cable system.

In contrast to the frequency utilization shown in FIG. 1, in FIG. 2, the frequency bands corresponding to cellular network interference, e.g., 700 to 726 MHz are used for communication of traffic data, e.g., Internet traffic data and/or other data, which is communicated using a communications protocol which supports a retry mechanism rather than the transmission of downstream broadcast or other downstream data which may not be subject to a communications retry mechanism. Similarly all or a portion of the 0 to 20 MHz band which is normally left unused due to various types of interference is used for communication of data using a protocol which supports retransmission of packets in the event a packet is not successful transmitted. Other portions of the available frequency bands may be used for broadcast downstream communications of multimedia content and/or upstream transmission depending on the bandwidth needs in a given deployment.

In the exemplary allocation 200 shown in FIG. 2 the low frequency range band, i.e., 0 to 20 MHz band is allocated and utilized for upstream communications, e.g., for communications from one or more CPEs such as set top box devices at customer locations to the headend/hubsite 302. As illustrated in the figure, the 0 to 20 MHz band includes one or more channels which are utilized for upstream communications in accordance with some embodiments. As should be appreciated, the 20 MHz to 40 MHz frequency band may also be utilized for upstream communications in addition to the 0 to 20 MHz band.

In accordance with the exemplary frequency allocation 200, the 50 to 1000 MHz band is partitioned in 3 parts to reduce the effect of cellular communication on downstream traffic. In accordance with one aspect the downstream traffic which is more likely to be affected by the cellular communications interference, such as the multimedia content to be communicated to customer devices, is assigned to be communicated via channels in the 50 to 700 MHz frequency band and frequency band starting above 725 MHz to 860 MHz as illustrated in FIG. 2 by reference numbers 202 and 204.

Furthermore the traffic that is more robust to interference from cellular communications and which can be delivered using transport protocol that includes retransmission mechanism in case of transmission errors is assigned to be communicated via channels in the 700 to 725 MHz frequency band. Thus in some embodiments internet traffic data (TCP/IP traffic) is communicated using channels in the 700 to 725 MHz frequency band while other downstream programming content may be moved out, e.g., reallocated, to other frequency bands for delivery of content to customer premises.

Thus, in at least some embodiments the frequency bands subject to cellular network interference are utilized for one or more upstream and/or downstream traffic data channels where packets are communicated using a protocol which provides for packet retransmission in the event of errors as may be indicated by a negative acknowledgement of a packet which can not be successful decoded and/or a failure for the sender to receive an expected affirmative acknowledgement in response to a packet transmission over the utilized communications channel.

Figure 3:
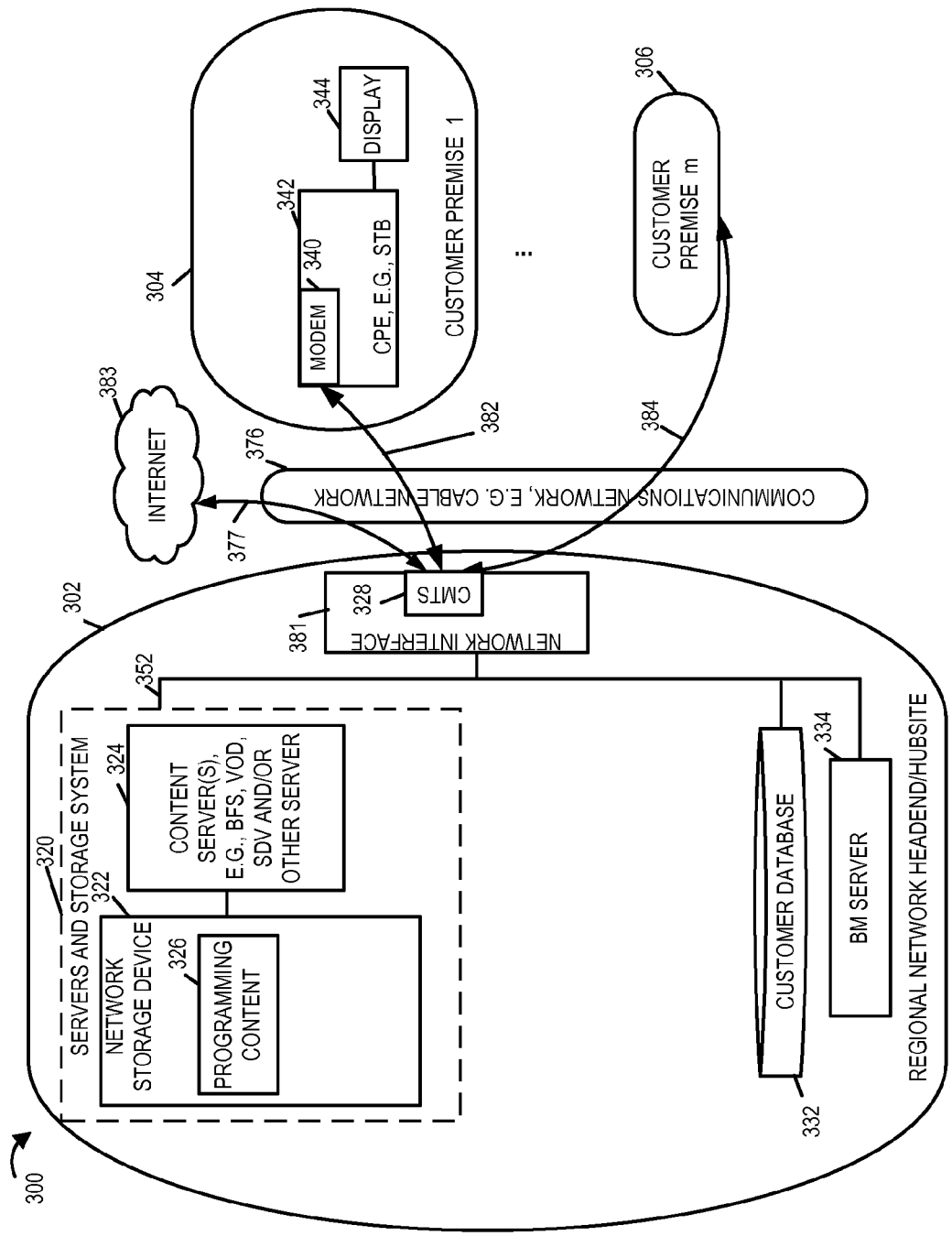
FIG. 3 illustrates an exemplary system implemented in accordance with some embodiments of the present invention.

FIG. 3 illustrates an exemplary system 300 implemented in accordance with one exemplary embodiment of the invention. System 300 supports delivery of content, e.g., video, audio and/or other multimedia content delivery, to customer premise equipment (CPEs), e.g., set top boxes and/or other user devices. The system 300 also supports web browsing via support for DNS lookups and Internet connectivity. In at least some embodiments mobile as well as fixed CPEs are supported.

The exemplary system 300 includes one or more subsystems which may be physically located at different locations. The one or more subsystems shown in the system 300 communicate and/or exchange information over one or more communications network, e.g., cable network, Internet etc. The various components of the system 300 will now be described. The system 300 includes a service provider system 302, e.g., cable network headend/hubsite, and a plurality of customer premises 304, 306.

The service provider system/headend 302 may be implemented at a service provider's office, hubsite or site including multiple servers and databases which are coupled together. In the FIG. 3 example, the headend 302 includes servers and storage system 320, a cable modem termination system 328, a customer database 332, and a business management server 334. The server and storage system 320 includes a network storage device 322 and content server(s), e.g., one or more content delivery servers including broadcast file server (BFS), video-on demand (VOD) server, switched digital video (SDV) server etc. It should be appreciated that one or more of the various servers and/or elements shown to be included in the headend 302, in some embodiments, reside outside the headend 302. In some embodiments one or more of the servers and/or elements is implemented in a distributed manner, with portions of the server or element residing at different locations in system 300. The various servers and other components included in the headend 302 are coupled together by a local network 352. The local network 352 is coupled via one or more network interfaces 381 to other networks and/or devices. For example, the headend 302 is coupled via network interface 381 to service provider's communications network 376, e.g., a cable network, and may also be coupled to one or more other external networks such as the Internet 383 which is coupled via link 377. The network interface 381 includes the cable modem termination system 328 through which data services and Internet access can be provided to one or more devices at the customer premises coupled to the network interface 381.

In various embodiments the content, e.g., multimedia content, is delivered from the headend over the communications network 376 to one or more devices at the customer premises. In some embodiments the communications network 376 is, e.g., a hybrid fiber-coaxial (HFC) network. Thus via the communications network 376, the devices in the network headend 302 can send and receive signaling and/or other information to the devices located at the customer premises 304, 306 coupled to the cable network 376.

As shown in FIG. 3, communications link 382 traversing the communications network 376 couples modem 340 to the network headend 302's network interface 381. Similarly, modems in other customer premises, e.g., customer premise 306, are coupled to service provider's system 302's network interface 381 via link 384 which traverses the communications network 376.

The server and storage system 320 includes content server(s) 324 and a storage device 322. Network storage device 322 stores programming content 326, e.g., audio and video content which may be delivered by a server included in the content server(s) 324 either as part of a content broadcast and/or in response to a user request for content received via network 376 from one or more devices at customer locations 304, 306. The content server(s) in some embodiments include a broadcast file server (BFS), an on-demand content server, a switched digital video (SDV) server, and/or another server that can be used to deliver content to CPEs. In various embodiments the content server(s) 324 access the programming content from the storage device 322 and generate transport streams suitable for delivery to various customer devices via the communications network 376.

The cable modem termination system (CMTS) 328 performs various operations in accordance with the invention, including, classifying traffic data and channel allocation for communicating traffic data such that the interference from the cellular communications are minimized or reduced. The CMTS 328 will be described in greater detail with reference to FIG. 4 which shows an exemplary CMTS which can be used in the network headend 302 or a customer premise device.

The customer database 332 includes information corresponding to a plurality of customers, including customer account information, customer subscription/service information, and information regarding the devices installed at customer premises. In some embodiments customer account information includes, e.g., customer account number, customer subscription/service information, and other billing related information. Customer device information includes device identification and/or other information regarding customer devices such as STBs, modems etc., installed at various customer premises served by the headend 302.

BM (Business management) server 334 processes billing information corresponding to customers serviced by the network headend 302. This may include updating billing charge information in response to changes in services being provided to the customer, upgrades, new purchases, and/or other activity. Business management server 332 also processes services bill payment information, e.g., bill payment transactions, deductions from debit accounts, mail bills, and/or processes discount and/or other information.

Referring now to the customer side of system 300. Each customer premise may include a plurality of customer premise equipments (CPEs). In various embodiments the CPEs located at the customer locations include, e.g., modems, routers, and user devices including, e.g., set top box, internet capable TVs, personal computers, laptops, tablet devices, smart phones etc. In various embodiments a user device such as a set top box presents the program content to a viewer, e.g., customer/subscriber. In some embodiments each customer premise 304, 306, includes a modem, a user device, e.g. set top box, and a display device.

FIG. 3 shows some details of a customer location, e.g., customer premise 1 304. Customer premise 304 a customer device, e.g. STB 342 coupled to a display device 344. In the FIG. 3 system the STB 342 includes modem 340. In other embodiments the modem 340 is located external to the STB and/or is used to couple a computer or router in the customer premise 304 to the Internet via the cable network headend, e.g., in embodiments where a cable module is used to support Internet communications. In some embodiments, modem 340 is a DOCSIS (Data Over Cable) modem. The display device 344 could be, e.g., an external television. It should be appreciated that the STB 342 can be integrated in a device which also includes a display. The STB 342 can be used to send information to the headend 302 in addition to receiving content and/or information from the headend 302. In addition, in some embodiments each customer premise 304, 306 may include one or more additional devices, e.g., IP devices that support internet protocol, such as a personal computer (PC), laptop, cell phone, etc., in addition to the STB. The STB 342 may, and often do, include DVR functionality and the storage of user selected content. In some embodiments rather than an external modem such as modem 340 the customer premise 304 includes STBs with a built in modem. Other customer premises shown in the system 300 may be similar to the customer premise 304 and may include same or similar CPEs.

The network headend and/or a hubsite includes a CMTS, e.g., as part of a network interface which couples one or more devices and/or network to the cable via which content is communicated to/from a customer premise. While shown in a headend in FIG. 3 it should be appreciated that the CMTS at the network side of the system may be located at a hubsite with a fiber connection providing data communications functionality between the hubsite and the network headend and/or Internet. A CMTS is also located at the customer premise, e.g., at the point of attachment to a coax cable used to communicate data to/from a customer premise site.

Figure 4:
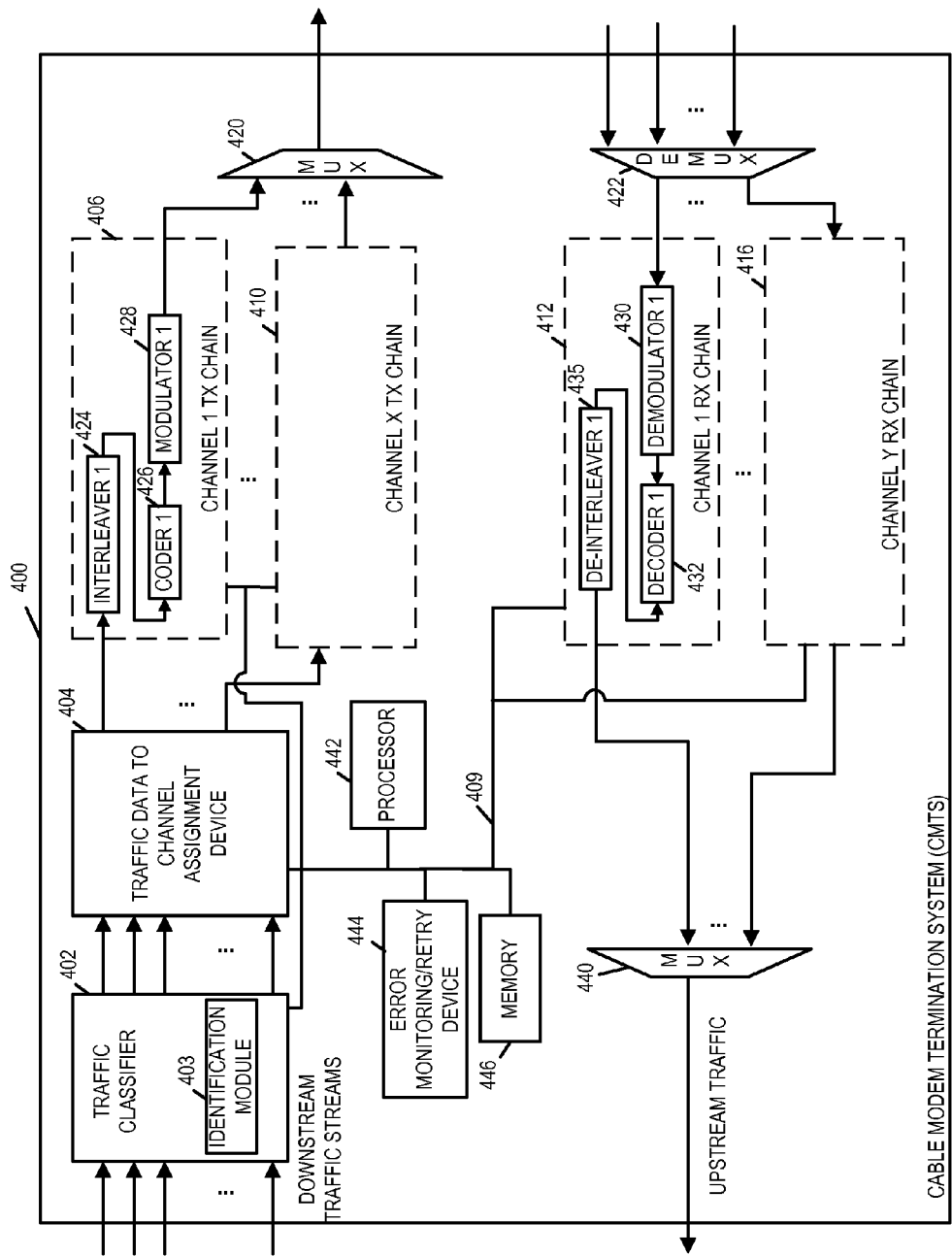
FIG. 4 illustrates an exemplary cable modem termination system (CMTS) implemented in accordance with an embodiment of the present invention which may be used in a headend, hubsite or customer premise device.

FIG. 4 illustrates an exemplary CMTS 400 which may be used as the CMTS 328 of a network headend or hub site. A CMTS located at a customer premise would include the same or similar elements but rather than downstream traffic entering the CMTS for transmission and upstream traffic leaving the CMTS for use by the headend or other network device, the CMTS in the customer premise would receive up stream data to be classified and transmitted and would recover and output downstream traffic to one or more devices at a customer premise. In either the headend CMTS embodiment shown in FIG. 4 or a STB/customer premise device, the CMTS would include similar components including a traffic classifier 402, traffic data to channel assignment device 404, a plurality of transmission chains 406, 410, e.g., one per transmission channel, a processor 442, an error monitoring/retry device 444 and memory 446. The various elements of the CMTS 400 are coupled together via bus 409 via which they exchange information. The processor 442, e.g., a CPU, executes control instructions and controls the CMTS 400 to operate in accordance with the invention. To control the CMTS 400, the processor 442 uses information and/or routines including instructions stored in memory 446. The error monitoring/retry device 444 detects signaling indicating communications errors, signals indicating a request to retransmit data and determines channel error rates and/or retry rates. The processor uses such error rate and/or retry request rate information to control interleaving, coding and/or modulation and makes changes to one or more of these three steps for a channel in response to detecting changes in error rates and/or retry requests on the channel and may and sometimes does alter the relative priority of channels based on error rate and/or retry information or changes in such information. Thus, in at least some embodiments the modulation used for a channel can, and in some embodiments is, also adjusted, e.g., in real time, based on detected errors and/or retry requests or the rate of errors/retry requests. The change in modulation maybe, and sometime is in addition to changes in the interleaving level and/or coding used where the coding change may be a change in the error correction coding applied to packets or across packets of data.

The traffic classifier 402 receives traffic streams to be transmitted and classifies them as will be discussed further below based on whether the packets in the streams correspond to a communication protocol which support a retry mechanism in the event of failing to successful communicate a packet or do not support a retransmission option. The classifier may, and in some embodiments does, further prioritize traffic once it has been classified as corresponding to a protocol which supports a retry mechanism or not. The packets to be communicated, along with the classification and priority information are provided to traffic data to channel assignment module 404. In various embodiments the traffic classifier 402 includes an identification module 403 configured to identify TCP/IP packets as first type packets. The identification module is further configured to identify UDP packets as second type packets. In some embodiments the traffic classifier 402 is further configured to prioritize packets (e.g., packets communicating traffic) based on packet content type.

The traffic data to channel assignment module 404 allocates classified packet streams to transmission channels based on the classification and/or priority level of the packets in the stream. The channels include a first group of channels subject to cellular network interference and a second group of channels which are not subject to cellular network interference, e.g., because they are outside the frequency band of cellular network signals. Once assigned to a channel, traffic data packets are passed to the transmission chain associated with the individual channel to which the packets have been assigned. In some embodiments the traffic to channel assignment device 404 is configured to: allocate packets having a first level of priority to communications channels in a first sub-group of said first group of communications channels, channels in said first sub-group being subject to a first level of cellular network interference, and allocate packets having a second level of priority to communications channels in a second sub-group of said first group of communications channels, channels in said second sub-group being subject to a second level of cellular network interference which is higher than said first level of cellular network interference.

Each channel transmission chain 406, 410 includes the same or similar components but may apply a different level of interleaving and/or error correction coding prior to modulation and transmission. The amount of interleaving and error correction coding is controlled, as will be discussed below, on the level of interference, e.g., cellular network interference and/or error rate of the corresponding channel. Given that interference and the error rate due to interference from a cellular device may change, e.g., as a cell phone moves closer or further away from a CMTS or other cable device, the level of interpolation and/or coding may also change. However, in some embodiments such dynamic change in the level of interpolation and/or coding is not supported and the level of coding and interpolation is fixed on a per channel basis based on know or expected interference levels in a given area.

To implement interleaving the transmission chain 406 corresponding to channel 1 includes an interleaver 424 which can interleave packets, e.g., reorder packets in the packet stream to spread packets relating to the same application or time period further apart from one another and thereby decrease the probability that a burst of interference will destroy multiple packets corresponding to the same application or time period. Thus interleaving and the level of interleaving can provide protection against burst errors with the data in different packets potentially including error correction information allowing for some or all of the data lost due to a burst error to be recovered. The coder 426 allows for the addition of error correction information to the packet stream and/or to individual packets. The amount of error correction coding added by coder 426 may, and sometime is, be controlled as a function of the detected channel error rate and/or level of cellular interference. Modulator 428 is used to modulate the interleaved and coded traffic data in the form of packets to the frequency of the channel to which the transmission chain corresponds, e.g., to a frequency band is subject to cellular network interference or a frequency band which is not subject to cellular network interference. In the case of channels not subject to cellular network interference interleaving and/or coding is performed at a lower level than on channels subject to higher levels of interference as is commonly the case with channels corresponding to the LTE frequency band and/or interleaving and coding is skipped for channels where interference is not an issue. MUX 420 multiplexes the modulated data prior to providing it onward for transmission over the transmission cable used to connect the MTS 400 to other devices.

While the upper part of the CMTS 400 supports the transmission of data via a cable network, the bottom portion deals with the processing of data received by the CMTS from a cable network. In the case of a CMTS 400 located at a headend, the receiver portion of the CMTS processes upstream data as shown in the FIG. 4 example but in a CMTS located in a customer premise the receiver portion would process downstream data.

The receive portion of the CMTS 400 includes a demultiplexer for demultiplexing channels and for providing the received channel signal to corresponding receiver chains 412, 416. The receiver chains perform demodulation decoding and de-interleaving to recover packets that were transmitted by a sending device, e.g., one or more cable modules in the case of a CMTS located at a headend or hub site. To support the demodulating, decoding and de-interleaver function, the receive chain 412 includes a demodulator 430, decoder 432 and a de-interleaver 435. The receive chains 416 corresponding to other channels include the same or similar elements as the receiver chain 412. Recovered packets are supplied to the multiplexer 440 which sends the recovered traffic packets onward to another device, e.g., in the headend or connect to the Internet depending on the destination address included in the recovered packets.

Figure 5B:
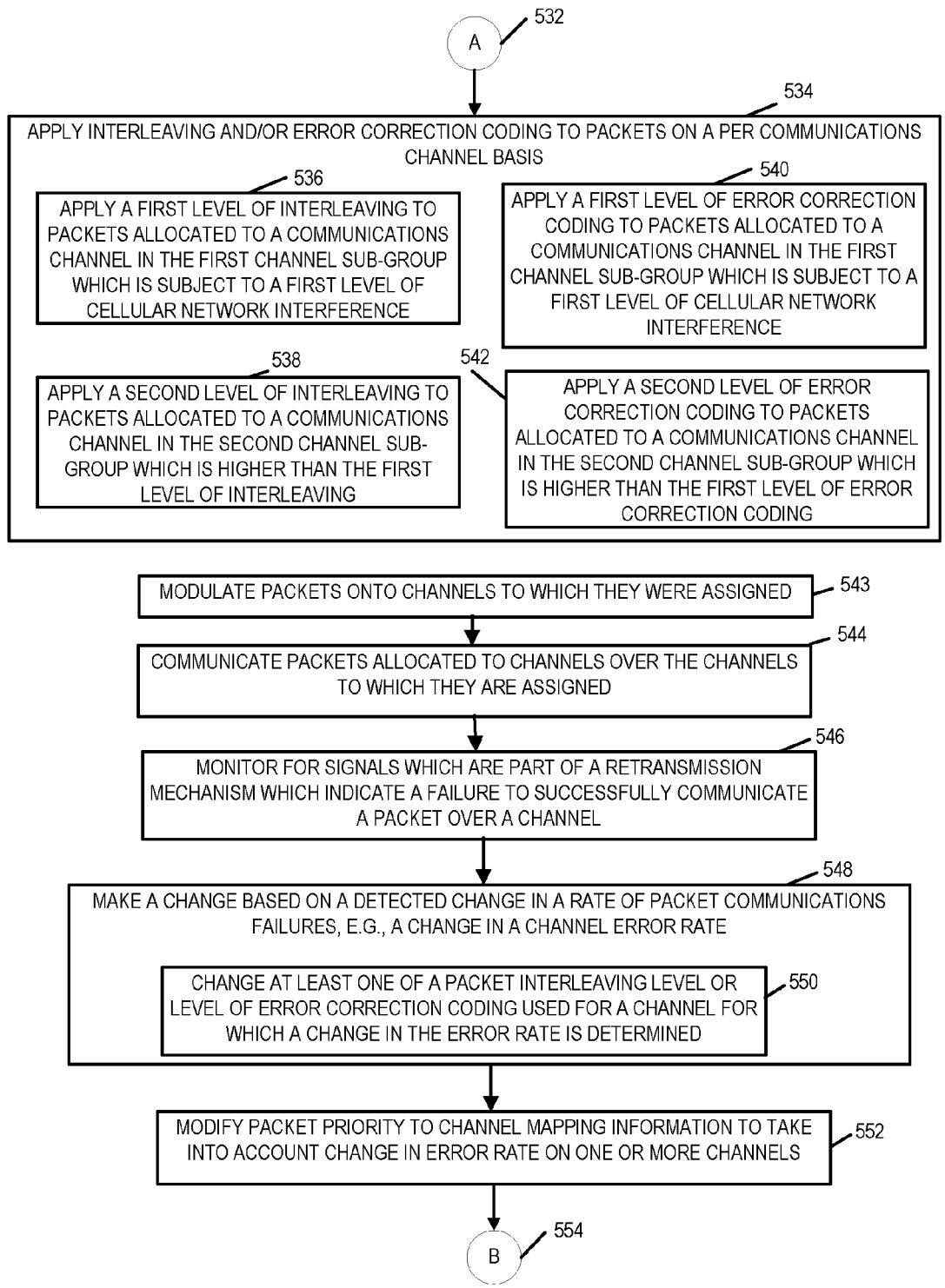
FIG. 5, which comprises the combination of FIGS. 5A and 5B, is a flowchart illustrating the steps of an exemplary method in accordance with the invention.

Having briefly explained the exemplary CMTS 400 the method of allocating traffic data to communications channels subject to cellular network interference, or not subject to cellular network interference, will now be explained further with reference to FIG. 5 which comprises the combination of FIGS. 5A and 5B.

The method 500 shown in FIG. 5 is implemented by a CMTS, e.g., the exemplary CMTS 400 shown in FIG. 4. The method 500 begins in start step 502 with the CMTS 400 being powered on and waiting to receive traffic streams, e.g., streams of data packets to be transmitted over a cable network. Operation proceeds from start step 502 to step 504 in which the CMTS stores, e.g., in memory, information mapping channels to frequency bands as well as information indicating a mapping of packet priority levels to channels. The information stored in step 504, maybe received from another device, e.g., a device in the communications network which controls channel allocation. The information stored in step 504 includes, in some embodiments, information on a first group of channels subject to cellular network interference and information relating to a second group of channels not subject to cellular network interference. Thus, information stored in step 504 may indicate which channels are subject to cellular network interference and thus should be used for communication of data using protocol which supports a retry mechanism and information on channels which are not subject to interference and are used in some embodiments to communicate best effort traffic or other traffic which is communicated without the use of a packet retransmission procedure in the event of an error.

Operation proceeds from step 504 to step 506 in which traffic, e.g., data packets, to be communicated are received. The packets may include, for example, TCP/IP packets communicating voice, video or application data such as text and/or packets communicated using a best effort protocol such as UDP which may be used to communicate some forms of Internet traffic where packets may be dropped if they are not successful communicated.

Operation proceeds from step 506 to step 508 in which packets a classified, e.g., based on whether they correspond to a protocol which supports a transmission retry mechanism or a protocol which does not support a transmission retry mechanism. In some embodiments step 508 includes step 510 in which packets corresponding to a communications protocol which supports a communication retry mechanism are classified as first type packets. As part of step 510 TCP/IP packets may be classified in sub-step 512 as first type packets. Classification step 508 may also include step 514 in which packets corresponding to a communications protocol which does not support a retry mechanism are classified as second type packets. As part of step 514, in substep 516 UDP packets may be identified as second type packets.

Operation proceeds from step 508 to step 518. In step 518 packets are prioritized based on packet content, e.g., the type of data being communicated in a packet. As part of step 518 first type packets may be prioritized in step 521 based on the type of content included in the packet. For example first type packets communicating audio corresponding to a communications session may be identified as high priority since such packets need to be received in a timely manner to be useful while packets communicating video data which may be buffered and have lower latency/jitter requirements may be assigned a lower priority than the audio packets for an ongoing communications session.

In addition to, or as an alternative to, prioritizing packets based on content, in step 522 the packets may be prioritized based on a priority level of the packet sender, the priority level of the device to which the packet is addressed and/or a service to which a packet corresponds.

After classification and prioritization which may be performed by the traffic classifier 402, operation proceeds to step 524 in which packets are assigned to channels based on the packet classification and/or determined packet priority level. Step 524 is normally performed by the traffic stream to channel assignment device 404.

In step 524 first type packets, e.g., packets corresponding to a communication protocol which supports a retry mechanism, are allocated to channels in the first group of communications channels, i.e., those channels subject to cellular network interference. Also in step 524 packets of the second type, e.g., those which correspond to a communications protocol which does not support a retry mechanism, are allocated to traffic channels in the second group of channels, i.e., those which are not subject to cellular network interference because they use frequency bands outside those used by cellular networks.

In some embodiments step 524 includes steps 526, 528 and 530. Steps 526 and 530 involve allocation of packets to the first group of communications channels based not only on the packets being classified as first type packets but also based on the priority level of the packets within the group of first type packets. In step 526 first type packets having a first level of priority, e.g., a high level of priority, are allocated to communication channels in a first sub-group of the first group of communications channels with relatively low cellular network interference. In step 530 first type packets having a second level of priority are allocated to communications channels in a second sub-group of the first group of communications channels where the second subgroup of channels is subject to a level of cellular interference which is higher than the level of cellular interference to which the first sub-group of channels is subjected. Thus, in one such embodiment lower priority first type packets are allocated to channels with more cellular network interference and thus may be subject to more delays and/or jitter due to a larger number of errors, a higher level of interleaving and/or larger delays associated with the time required to implement a higher level of error correction coding than is used for the first sub-group of channels.

In addition to the allocation steps relating to first type packets, step 524 includes step 528 which involves allocation of second type packets to one or more channels in the second group of channels, i.e., channels which are not subject to cellular network interference. Thus, in step 528, packets which correspond to a communications protocol which does not support transmission retries, area allocated to channels which are not subject to cellular interference. In many cases the second type packets are packets of lower priority, e.g., best effort packets, than the packets transmitted over the lower quality less reliable channels subject to cellular network interference. Thus, step 524 includes what might be considered a counter intuitive approach to allocating packets to channels with packets transmitting lower priority data being allocated to better communications channels than first type packets which are used in many cases to transmit higher priority traffic.

Operation proceeds from step 524 to step 534 via connecting node B 532. In step 534 interleaving and/or error correcting coding are applied on a per channel basis to packets assigned to communications channels. The interleaving may be performed by the interleaver 424 corresponding to the individual channel while the error correcting coding may be applied by the coder 426 corresponding to the individual channel. The level of interleaving and/or error correction coding maybe and in some embodiments is a function of the amount of interference and/or rate of detected errors on a channel with less reliable channels subject to higher levels of cellular interference being provided with higher levels of interleaving and/or error correction coding.

In some embodiments step 534 includes interleaving steps 536 and 538. In step 536 a first level of packet interleaving is applied to packets allocated to a communications channel in the first channel sub-group where the channel is subject to a first level of cellular network interference. In step 538 a second level of packet interleaving is applied to packets allocated to a communications channel in the second channel sub-group where the channel is subject to a second level of cellular network interference which is higher than the first level of interference and where the second level of interleaving involves a greater packet depth of reordering than the first level of interleaving.

Steps 540 and 542 relate to the level of error correction coding applied. The coding may be across packets or involve adding error correcting bits to individual packets. Either coding technique facilitates error correction capabilities in the event of interference which can cause a communication error. In step 540 a first level of error correction coding is applied to packets allocated to the communications channel in the first channel sub-group where the channel is subject to the first level of cellular network interference. In step 5430 a second level of error correction coding is applied to packets allocated to the communications channel in the second channel sub-group where the channel is subject to the second level of cellular network interference which is higher than the first level of interference. The second level of error correcting coding is a higher level of error correction coding providing greater protection against errors than said first level of error correction coding.

Operation proceeds from step 534 to step 543 in which the interleaved and coded packets are modulated onto the communications channel to which they have been assigned. Then in step 544 the modulated packets are transmitted, e.g., communicated on the communications channels to which they were assigned.

As part of the communications process, for packets communicated using a protocol which supports a retry mechanism, signals may be received indicating an error or an expected acknowledgment signal may not be received. Monitoring for such signals which are part of a retry mechanism is performed in step 546.

Based on the monitoring of step 546 the CMTS implementing the method is aware of error rates and/or requests for retransmission on the first group of communications channels. This information can be used by the CMTS or communicated to another device in the network which compares the error rates and/or retransmission rates of particular channels and rates, e.g., ranks, the channels available in the first group of channels. The monitoring and ranking of channels is sometime done by a processor in the CMTS. The processor in the CMTS may, and sometimes does, also dynamically change the level of interleaving and/or error correction coding used on a per channel basis for channels in the first group of channels, e.g., those subject to consistent or intermittent cellular network interference.

In step 548 a change is made, e.g., in the level of interleaving, level of error correction coding, and/or priority level of a channel based on a detected change in a rate of packet communication failures, e.g., as indicated by a change in a monitored error rate and/or transmission retry rate. Step 548 may and sometimes does includes step 550 which involves changing at least one packet interleaving level or level of error correction coding used for a channel for which a change in the error rate is determined. Changes in the information may be stored in the CMTS memory and used in controlling assignments of packets to channels.

Operation proceeds from step 548 to step 552. In step 552 packet priority level to channel mapping information is changed to take into consideration a change in an error rate on one or more channels. Thus, in step 552 the fact that a channel may be subject to more interference at one point in time is addressed with the priority level, e.g., quality level, being updated to reflect the currently availably information on error rates and/or channel interference.

Operation proceeds from step 552 to step 504 via connecting node B 554 with packet to channel allocation being performed on an ongoing basis.

Using the method shown described in FIG. 5, a cable network can take advantage of communications channels subject to ever increasing amounts of LTE interference in a manner that provides for efficient and reliable use of the communications channels even as the levels of interference in a geographic area may vary with time, e.g., because of the movement and/or use of cellular device in proximity to STBs and/or other equipment including a cable modem of other cable network equipment.

Numerous variations on the above described embodiments are possible.

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a media content distribution system. Various embodiments are also directed to methods, e.g., a method of controlling the distribution of media content, e.g., video on demand audio and/or video content. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method. In some embodiments devices, elements and/or modules that are configured to perform various functions are implemented as circuits, e.g., with a different circuit for each function being implemented in some but not necessarily all embodiments.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware, e.g., in circuitry, ASICs, ICs, etc. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A method of operating a cable modem termination device, the method comprising:
operating a traffic classifier to classify traffic to be communicated based on at least whether the traffic is being communicated using a retry mechanism in the event of a communication error, traffic classified as corresponding to a first type being communicated using a communications protocol which supports a retry communications mechanism, traffic classified as corresponding to a second type being communicated using a communications protocol which does not support a communications retry mechanism;
operating a traffic to channel assignment device to assign classified traffic to communications channels based on traffic classification, said assigning including assigning at least some traffic of said first type to communications channels in a first group of communications channels, said first group of communications channels corresponding to frequencies which are subject to wireless communications device interference, said assigning classified traffic further including assigning traffic of the second type to one or more communications channels in a second group of communications channels, said second group of communications channels corresponding to frequencies that are not subject to wireless communications device interference; and
operating a processor to control at least one of interleaving, coding or modulation used for a given channel.

2. The method of claim 1, wherein operating the traffic classifier to classify traffic includes identifying TCP/IP Transmission Control Protocol/Internet Protocol (TCP/IP) packets as first type packets.

3. The method of claim 2, wherein operating the traffic classifier to classify traffic further includes identifying User Datagram Protocol (UDP) packets as second type packets.

4. The method of claim 3, wherein at least some of said UDP packets are best effort packets having a lower communications priority than at least some of said first type packets.

5. The method of claim 4,
wherein said wireless communications device interference is interference from one or more cellular network devices;
wherein said first type traffic includes said first type packets, the method further comprising:
operating the traffic classifier to prioritize first type packets based on packet content type;
operating the traffic to channel assignment device to allocate packets having a first level of priority to communications channels in a first sub-group of said first group of communications channels, channels in said first sub-group being subject to a first level of cellular network interference;
operating the traffic to channel assignment device to allocate packets having a second level of priority to communications channels in a second sub-group of said first group of communications channels, channels in said second sub-group being subject to a second level of cellular network interference which is higher than said first level of cellular network interference.

6. The method of claim 5, further comprising:
operating an interleaver to apply a first level of packet interleaving to packets allocated to a communications channel in said first sub-group; and
operating said interleaver to apply a second level of packet interleaving to packets allocated to a communications channel in said second sub-group, said second level of packet interleaving being higher than said first level of packet interleaving.

7. The method of claim 6, further comprising:
operating a coder to apply a first level of error correction coding to packets allocated to said communications channel in said first sub-group; and
operating said coder to apply a second level of error correcting coding to packets allocated to said communications channel in said second sub-group, said second level of error correction coding being higher than said first level of error correction coding.

8. The method of claim 7, further comprising:
operating an error monitoring device to monitor for signals which are part of a retransmission mechanism indicating a failure to successfully communicate a packet over channels in said first group of communications channels; and
operating said processor to change at least one of the level of packet interleaving and error correction coding used on at least one of the communications channels in said first group of communications channels in response to a change in a packet transmission failure rate for the communications channel determined from said monitoring.

9. A cable modem termination device comprising:
a traffic classifier configured to classify traffic to be communicated based on at least whether the traffic is being communicated using a retry mechanism in the event of a communication error, traffic classified as corresponding to a first type being communicated using a communications protocol which supports a retry communications mechanism, traffic classified as corresponding to a second type being communicated using a communications protocol which does not support a communications retry mechanism;
a traffic to channel assignment device configured to assign classified traffic to communications channels based on traffic classification, said assigning including assigning at least some traffic of said first type to communications channels in a first group of communications channels, said first group of communications channels corresponding to frequencies which are subject to wireless network interference, said assigning classified traffic further including assigning traffic of the second type to one or more communications channels in a second group of communications channels, said second group of communications channels corresponding to frequencies that are not subject to wireless network interference; and
a processor configured to control at least one of interleaving, coding or modulation used for a given channel.

10. The cable modem termination device of claim 9, wherein said traffic classifier identifies Transmission Control Protocol/Internet Protocol (TCP/IP) packets as first type packets.

11. The cable modem termination device of claim 10, wherein said traffic classifier identifies User Datagram Protocol (UDP) packets as second type packets.

12. The cable modem termination device of claim 11, wherein at least some of said UDP packets are best effort packets having a lower communications priority than at least some of said first type packets.

13. The cable modem termination device of claim 12, wherein said wireless network interference is cellular network interference.

14. The cable modem termination device of claim 13, wherein said wireless network interference is interference from Long Term Evolution (LTE) devices.

15. The cable modem termination device of claim 13,
- wherein said first type traffic includes said first type packets,
- wherein the traffic classifier is further configured to prioritize first type packets based on packet content type; and
- wherein said traffic to channel assignment device is further configured to:
- allocate packets having a first level of priority to communications channels in a first sub-group of said first group of communications channels, channels in said first sub-group being subject to a first level of cellular network interference; and
- allocate packets having a second level of priority to communications channels in a second sub-group of said first group of communications channels, channels in said second sub-group being subject to a second level of cellular network interference which is higher than said first level of cellular network interference.

\* \* \* \* \*